United States Patent
Grant et al.

(10) Patent No.: US 7,278,349 B2
(45) Date of Patent: Oct. 9, 2007

(54) CARAFE WITH OUTLET IN HANDLE

(75) Inventors: Anthony B. Grant, Weston, FL (US);
Larry T. McKinney, Weston, FL (US);
Baron C. Brandt, Chelsea, MA (US);
Benjamin J. Beck, Boston, MA (US);
Oliver B. McLachlan, Chelmsford, MA (US)

(73) Assignee: Applica Consumer Products, Inc., Miramar, FL (US)

( * ) Notice: Subject to any disclaimer, the term of this patent is extended or adjusted under 35 U.S.C. 154(b) by 469 days.

(21) Appl. No.: 10/919,719

(22) Filed: Aug. 17, 2004

(65) Prior Publication Data

US 2006/0037480 A1   Feb. 23, 2006

(51) Int. Cl.
*A47J 31/00* (2006.01)
*A47G 19/00* (2006.01)
*B67D 3/00* (2006.01)

(52) U.S. Cl. .................. 99/300; 99/306; 99/323.3; 222/473; 222/475; 222/475.1

(58) Field of Classification Search ............... 99/323.3, 99/323, 300, 304, 306; 222/475.1, 469, 470, 222/471, 473, 475
See application file for complete search history.

(56) References Cited

U.S. PATENT DOCUMENTS

| 193,016 | A | * | 7/1877 | McClave | 222/184 |
| 1,090,607 | A | * | 3/1914 | Fritz | 141/342 |
| 1,281,991 | A | * | 10/1918 | Menendez | 222/426 |
| 4,392,594 | A | * | 7/1983 | Swett et al. | 222/530 |
| 4,504,176 | A | * | 3/1985 | Lindberg et al. | 405/271 |
| 4,684,038 | A | * | 8/1987 | Gaul et al. | 222/89 |
| 5,189,946 | A | * | 3/1993 | Leon | 99/403 |
| 5,944,224 | A | * | 8/1999 | Hodge et al. | 222/131 |
| 6,755,120 | B1 | * | 6/2004 | Lin | 99/323.3 |

* cited by examiner

*Primary Examiner*—Reginald L. Alexander
(74) *Attorney, Agent, or Firm*—Baker Botts L.L.P.

(57) ABSTRACT

A beverage carafe including a main section having a first liquid dispensing system comprising a pouring spout, and a handle connected to the main section for tilting the main section. The beverage carafe can be tilted to pour liquid from the pouring spout. The carafe also includes a second liquid dispensing system extending through the handle from the main section. The second liquid dispensing system is adapted to be actuated to dispense liquid from the main section out of the handle.

22 Claims, 11 Drawing Sheets

CARAFE WITH OUTLET IN HANDLE

BACKGROUND OF THE INVENTION

1. Field of the Invention

The present invention relates to a carafe and, more particularly, to a carafe having two liquid dispensing systems.

2. Brief Description of Prior Developments

Carafes are generally well know. One type of carafe is used in coffee makers such as under-cabinet mounted coffee makers. The carafe is removed from the coffee maker and tilted to pour brewed coffee from a pour spout of the carafe.

There is a desire to provide a new type of carafe which can dispense liquid in two different fashions. More specifically, there is a desire to provide a coffee maker carafe which can be removed from the coffee maker and tilted to pour brewed coffee similar to a conventional coffee maker carafe, but which can also dispense brewed coffee without having to be removed from the coffee maker, such as when dispensing a single serving of brewed coffee into a cup or mug.

SUMMARY OF THE INVENTION

In accordance with one aspect of the present invention, a beverage carafe is provided including a main section having a first liquid dispensing system comprising a pouring spout, and a handle connected to the main section for tilting the main section. The beverage carafe can be tilted to pour liquid from the pouring spout. The carafe also includes a second liquid dispensing system extending through the handle from the main section. The second liquid dispensing system is adapted to be actuated to dispense liquid from the main section out of the handle.

In accordance with another aspect of the present invention, a coffee maker is provided comprising a main unit and a carafe. The main unit comprises a coffee brewing section. The main unit is adapted to be mounted to an underside of a cabinet. The carafe is removably connected to the main unit to receive coffee from the coffee brewing section. The carafe comprises a first outlet for pouring the coffee when the carafe is removed from the main unit and a second outlet for dispensing the coffee from the carafe when the carafe is mounted to the main unit or when the carafe is removed.

In accordance with one method of the present invention, a method of dispensing a liquid from a carafe is provided comprising grasping the carafe at a handle of the carafe and tilting the carafe to pour the liquid from a top spout of the carafe; and alternatively actuating a control at the handle of the carafe to dispense the liquid from the handle while the carafe is supported (e.g., by a brewing apparatus), and without tilting the carafe to pour.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
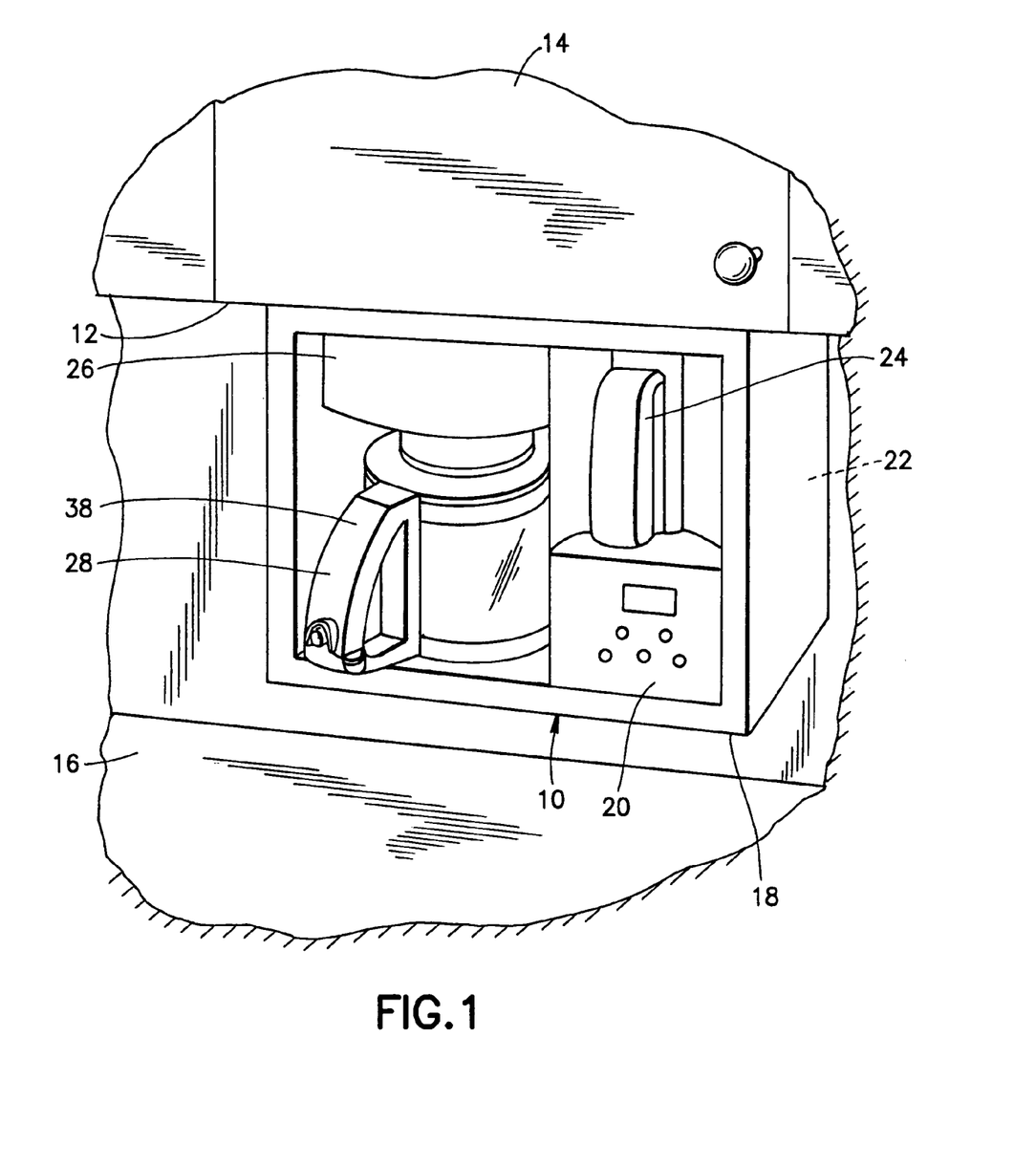
FIG. 1 is a perspective view of an exemplary embodiment of a coffee maker having a carafe incorporating features of the present invention.

Referring to FIG. 1, there is shown a perspective view of an exemplary embodiment of a coffee maker 10 incorporating features of the present invention. In the embodiment shown, the coffee maker 10 is an under-cabinet mounted coffee maker shown attached to a bottom 12 of kitchen cabinet 14 spaced over a kitchen countertop 16. However, features of the present invention could be used with a coffee maker which is not under-cabinet mounted. For example, features of the present invention could be used in a commercial coffee brewer when a pot of brewed coffee is supported in an elevated position on a top heating plate. Although the present invention will be described with reference to the exemplary embodiments shown in the drawings, it should be understood that the present invention can be embodied in many alternate forms of embodiments. In addition, any suitable size, shape or type of elements or materials could be used.

The coffee maker 10 could be any suitable type of brewing device, and could be adapted to brew tea for example. In the embodiment shown, the coffee maker 10 comprises a frame 18, a control section 20, a water heater 22, a removable water reservoir 24, a removable coffee grounds container 26, and a removable beverage carafe 28. With the exception of the carafe 28, the other components of the coffee maker 10 in FIG. 1 are conventional.

Figure 2:
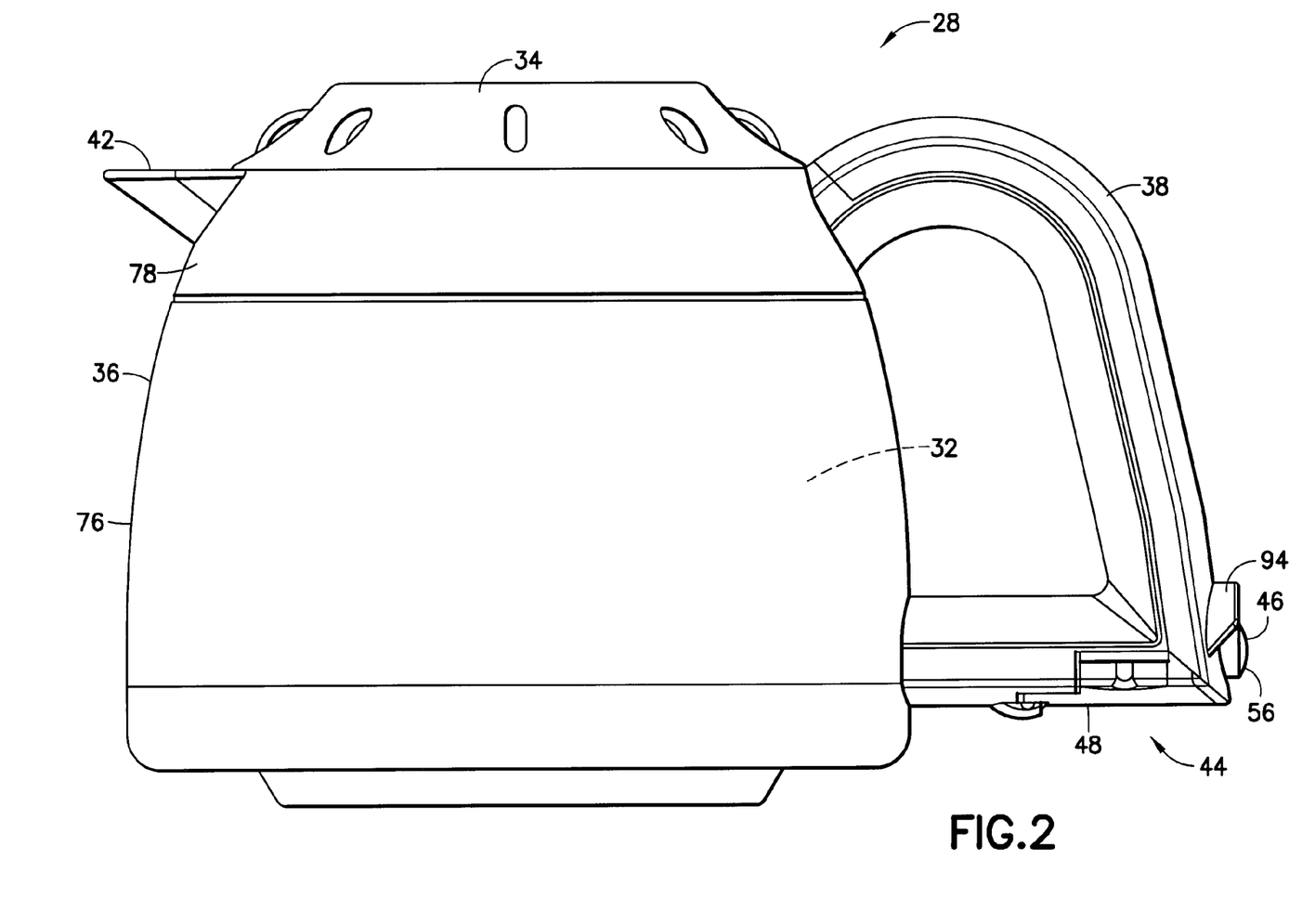
FIG. 2 is a side elevational view of an exemplary embodiment of a carafe incorporating features of the present invention.
Figure 3:
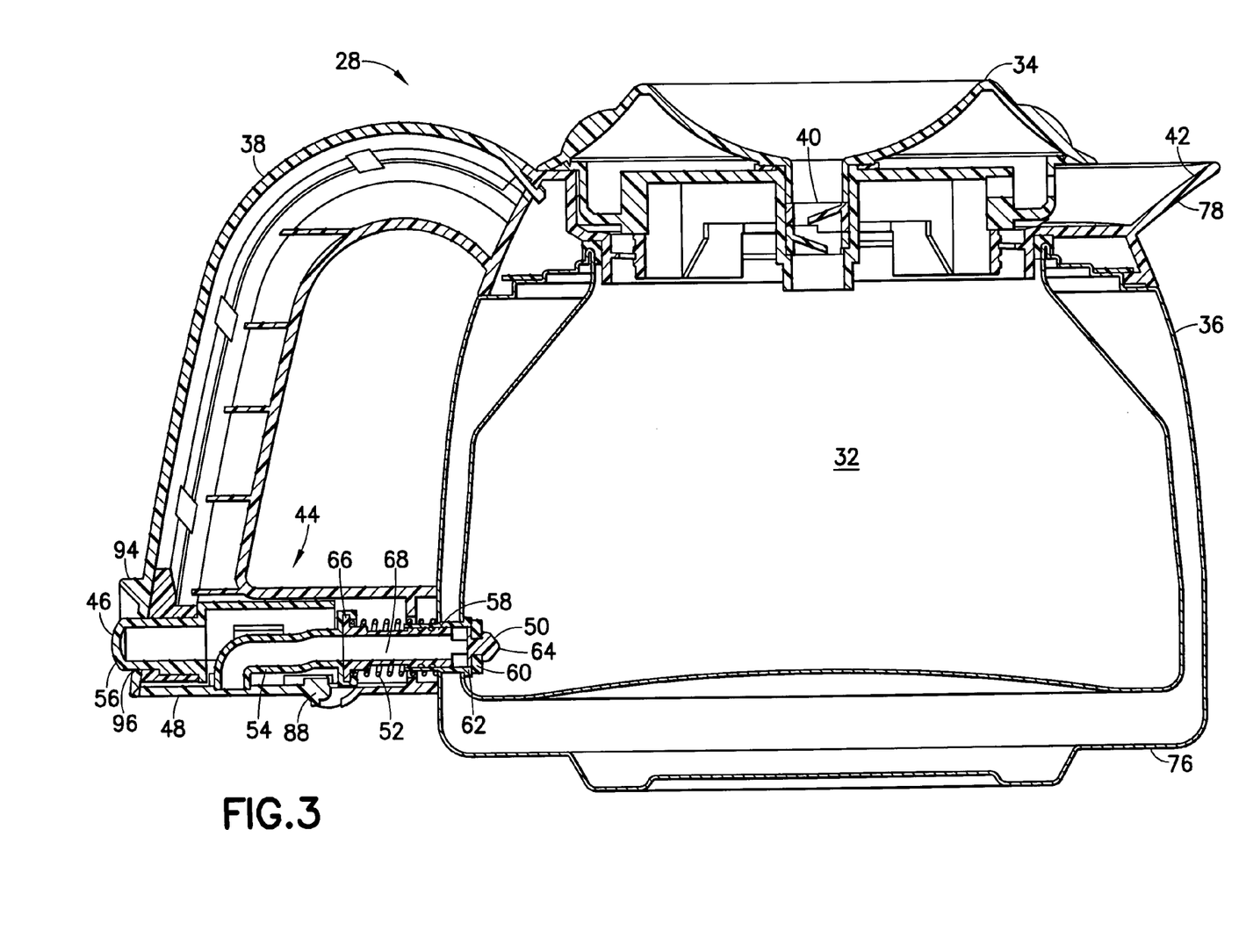
FIG. 3 is a cross-sectional view of the carafe shown in FIG. 2.
Figure 4:
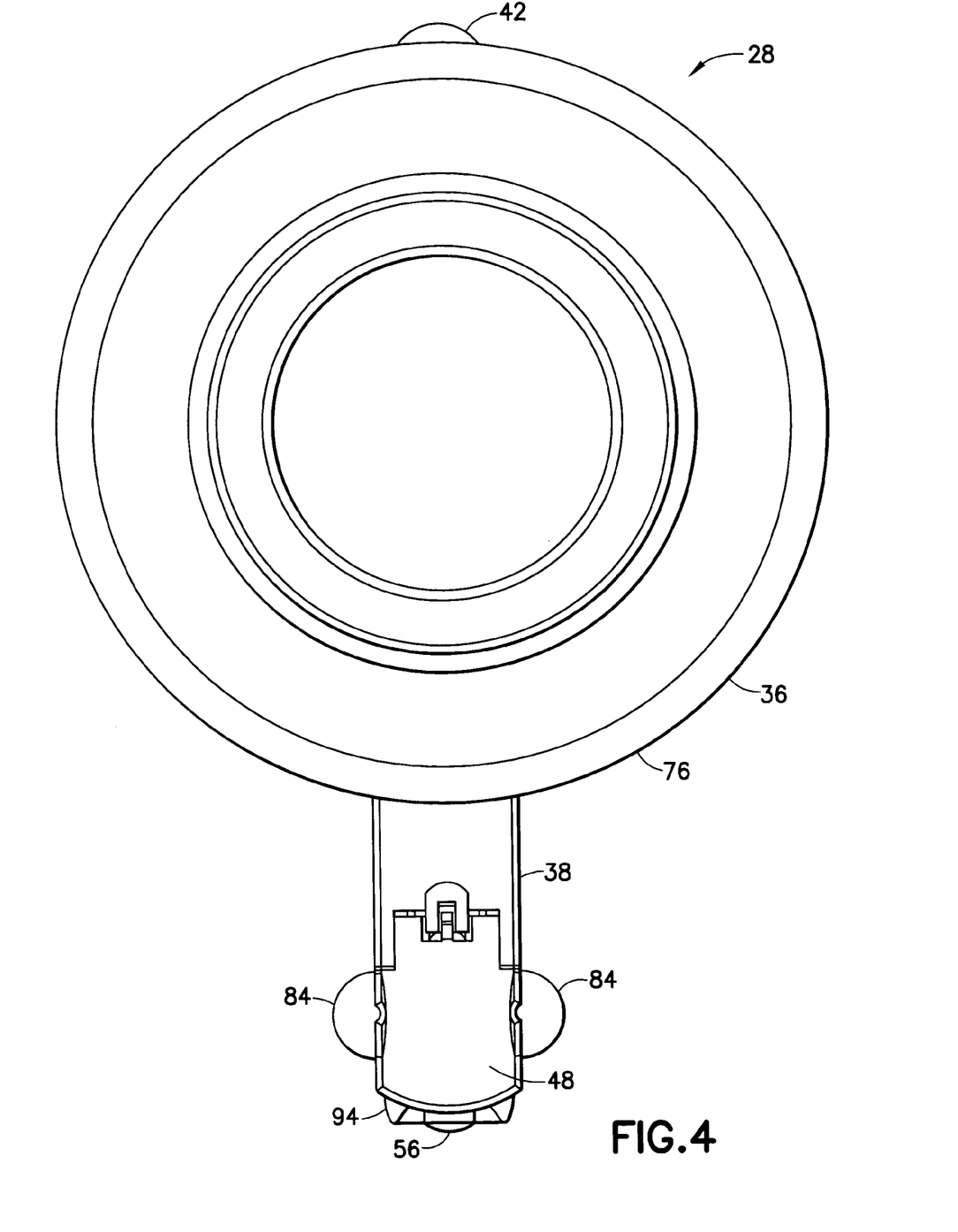
FIG. 4 is a bottom plan view of the carafe shown in FIG. 2.
Figure 5:
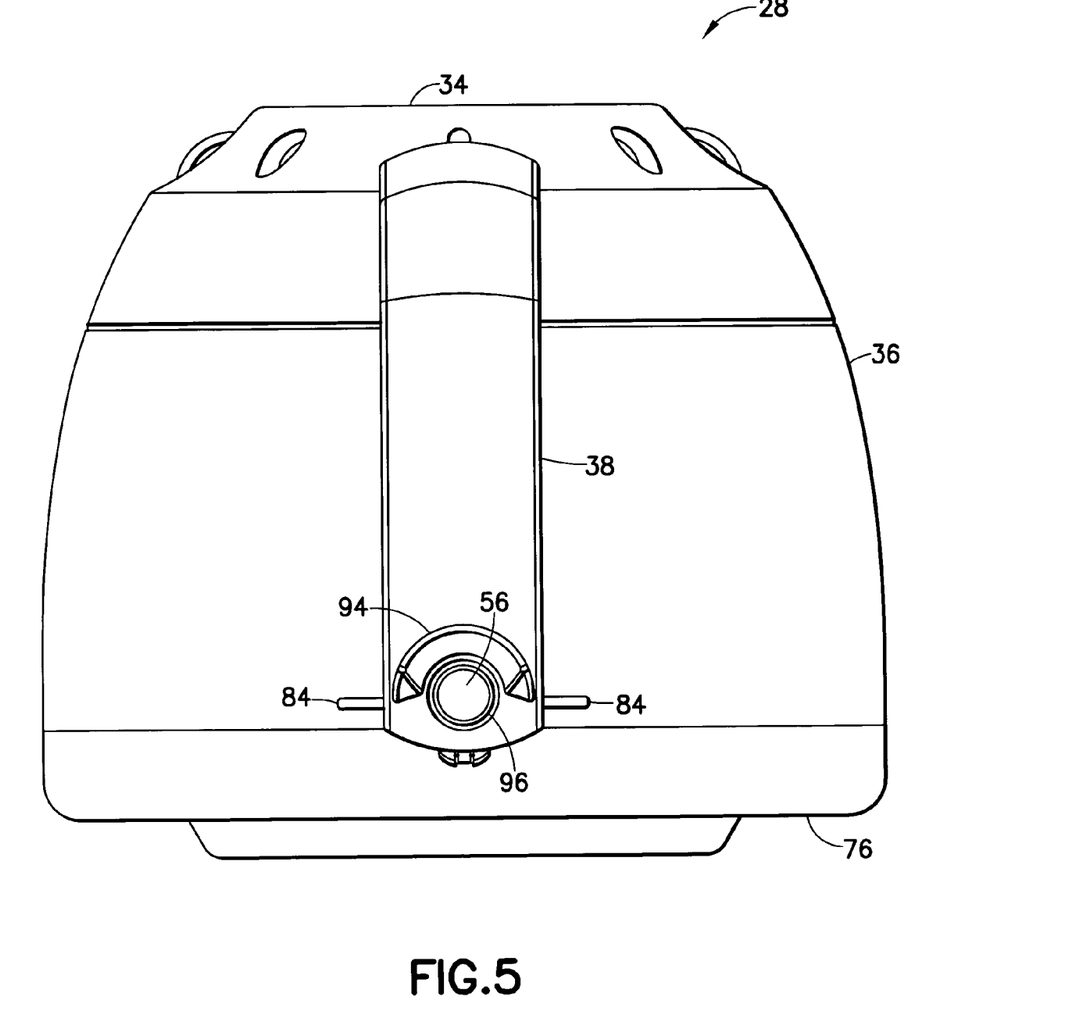
FIG. 5 is a handle side elevational view of the carafe shown in FIG. 2.

Referring also to FIGS. 2-3, the carafe or coffee pot 28 generally comprises a main section 36 and a handle 38. The carafe is a hand-held unit which can be removed from the coffee maker for serving coffee from the carafe, such as is normally done with a coffee pot or coffee maker carafe. Referring also to FIGS. 4-9, the main section 36 is formed from housing members comprising a first member 76 and a second member 78, and from a lid 34. The first member 76 advantageously has a dual wall construction. The inner wall forms an inner reservoir 32. The outer wall is spaced from the inner wall, except at the top where they are joined together. This arrangement advantageously provides an air gap or insulator section between the reservoir 32 and the outer wall of the first member 76.

The second member 78 is stationarily attached to the top of the first member 76. In a preferred embodiment, the second member is comprised of molded plastic or polymer material. The second member forms a receiving area for receiving the lid 34. The second member 78 also forms most of the handle 38. The lid 34 has a top aperture 40 to allow brewed coffee to enter into the inner reservoir 32 while the lid is attached to the top of the housing. In the embodiment shown, the lid 34 is screwed into a receiving seat at the top of the second member 78. The lid 34 is removable from the housing by unscrewing the lid from the top of the second member 78. In alternate embodiments, any suitable lid design could be used.

The second member 78 comprises a pour spout 42. The second member 78 and lid 34 form a first liquid dispensing system for pouring liquid from inside the inner reservoir 32 out of the carafe at the pour spout 42. In particular, a user can partially unscrew the lid 34 to open a path from inside the inner reservoir to the pour spout 42 and, upon tilting the carafe 10, the liquid inside the inner reservoir can pour out of the inner reservoir, through the passage between the second member 78 and the lid 34, and out of the spout 42. The carafe 10 would need to be removed from the coffee maker frame 18 to accomplish this first type of liquid dispensing. In alternate embodiments, any suitable type of construction to accomplish tilt-dispensing could be provided.

Figure 6:
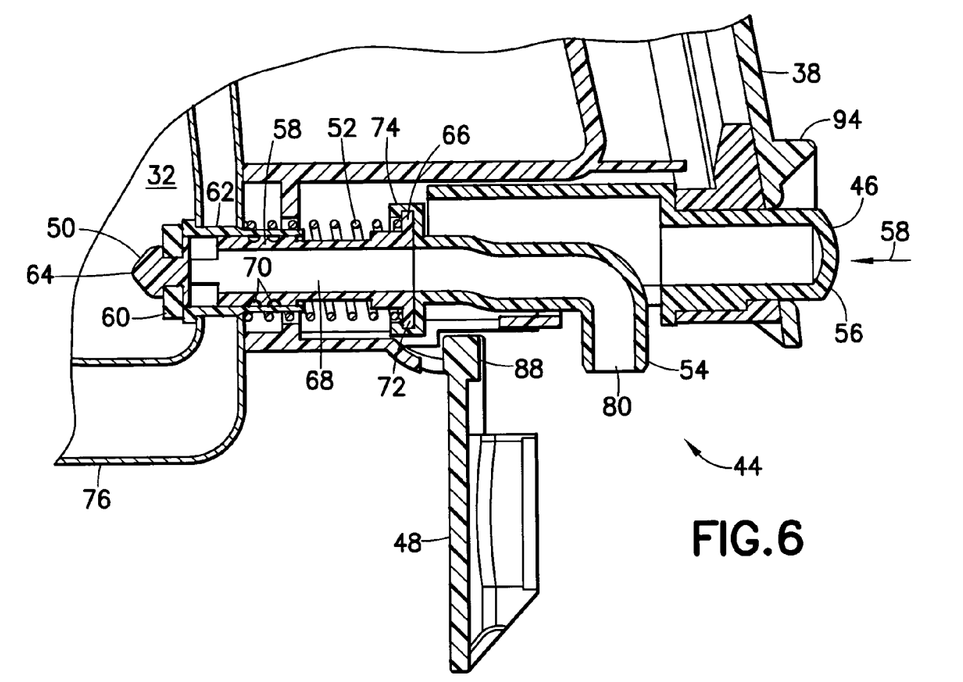
FIG. 6 is an enlarged partial cross sectional view of the bottom of the handle of the carafe shown in FIG. 3 with the bottom cover flipped down to an open position.

Referring also to FIG. 6, the carafe 28 also comprises a second liquid dispensing system 44. The second liquid dispensing system 44 extends from the inner reservoir 32 and through a portion of the handle 38. The second liquid dispensing system 44 generally comprises an actuator 46, a bottom cover 48, a valve 50, a spring 52 and a conduit member 54. The valve 50 generally comprises a movable member 58, a seal 60, and a mounting portion 62 of the first housing member 76. The mounting portion 62 has a general tube shape and extends from the inner reservoir 32 and laterally past the outer wall of the first member 76.

The movable member 58 is movably mounted in the mounting portion 62 and extends into the inner reservoir 32. The movable member 58 has a front section 64, a rear section 66 and a conduit 68 therebetween. The seal 60 is mounted to the front section 64 and is adapted to contact and seat against the front of the mounting portion 62 inside the inner reservoir 32 when the valve is in the retracted sealing position shown in FIGS. 3 and 6. Seals 70, such as O-rings, are provided on the movable member 58 between the movable member and the mounting member 62 to prevent liquid from passing therebetween.

The rear section 66 of the movable member 58 has a flange 72. The flange 72 is adapted to have a front portion 74 of the conduit member 54 mounted thereon. The connection between the flange 72 and the front portion 74 of the conduit member 54 provides a sealed connection between the rear end of the movable member 58 and the front end of the conduit member 54. Thus, a sealed conduit is provided from the conduit 68 into the passage through the conduit member 54.

The spring 52 forms part of the valve 50. The front end of the spring is located against the exterior side of the outer wall of the first housing member 76 around the outward projecting mounting portion 62. The opposite end of the spring is located against the inward facing side of the front portion 74 or the inward facing side of the flange 72. The spring 52 is adapted to bias the movable member 58 in an outward direction in a home position such that the seal 60 engages the mounting portion 62 inside the reservoir to prevent liquid from exiting the reservoir 32 at the mounting portion 62.

Figure 8:
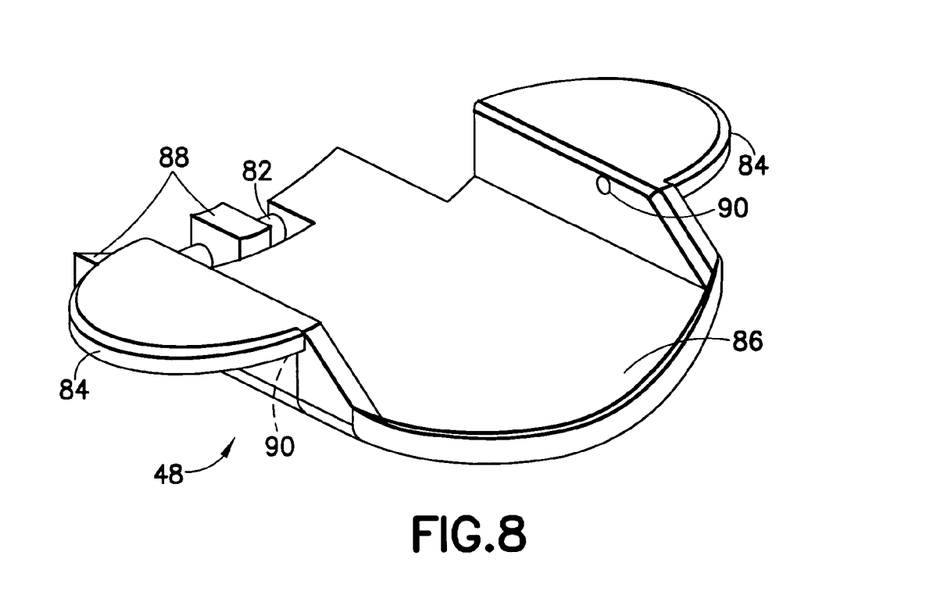
FIG. 8 is a perspective view of the bottom cover shown in FIGS. 6 and 7.

The conduit member 54 has a rear end with a down-turned shape. Thus, an outlet 80 from the conduit member 54 faces a downward direction. The handle 38 has an opening along its bottom side. The outlet 80 is located at the opening in the bottom side of the handle. The handle 38 has the bottom cover 48 movably mounted at the opening along the bottom side of the handle. FIG. 8 shows a perspective view of the cover 48. The cover 48 has a pivot mounting section 82, side flaps 84, and a top/inward facing surface 86.

Figure 7:
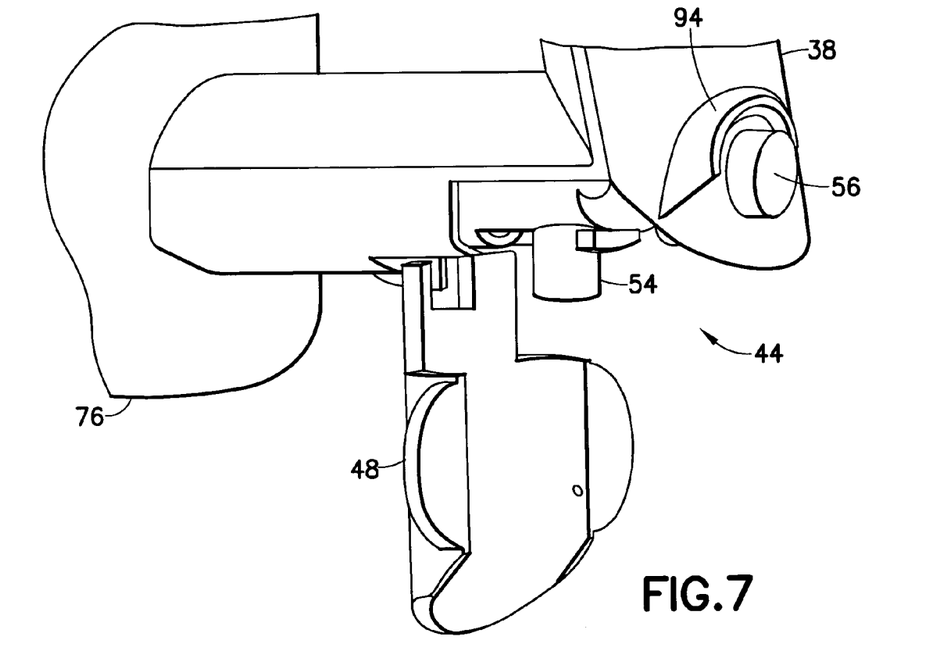
FIG. 7 is a partial perspective view of the bottom of the handle shown in FIG. 6.
Figure 9:
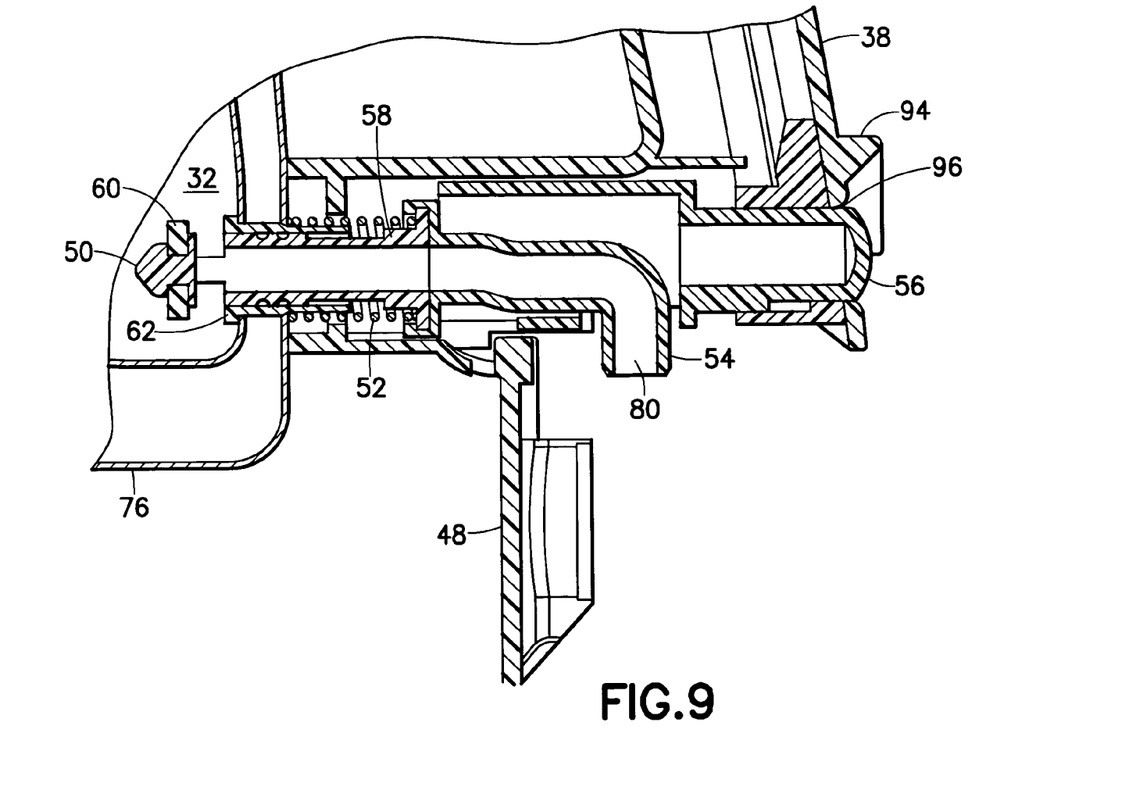
FIG. 9 is an enlarged partial cross sectional view of the bottom of the handle of the carafe shown in FIG. 6 with the bottom cover flipped down to an open position and the actuator moved to an actuated position to move the valve to an open position.

The pivot mounting section 82 is pivotably attached to the handle 38 on the bottom side of the handle. The pivot mounting section 82 has blockers 88 which extend upward past the surface 86. The cover 48 has two positions; an up closed position as shown in FIGS. 2-5 and a down open position as shown in FIGS. 6, 7 and 9. In the up position as seen in FIG. 3, the blockers 88 are located in front of a path of a portion of the actuator 46. In the down position as seen in FIGS. 6 and 9, the blockers are not located in front of the path of the actuator 46.

When the cover 48 is in its up closed position, the surface 86 of the cover 48 can contact the end of the conduit member 54 to cover the outlet 80. This can prevent residual liquid in the conduit from dripping out of the conduit member 54 when the cover is closed. The cover 48 has opposing interference projections 90 (see FIG. 8) at the side flaps 84. The projections 90 are used to latch the cover 48 at its up closed position. A user can use the side flaps 84 to overcome the interference latch of the projections 90 with the handle 38 to flip the cover down. In alternate embodiments, any suitable type of latch or system to retain the cover in a closed position could be provided.

The actuator 46 comprises the button 56. In an alternate embodiment, any suitable type of actuator could be provided. An end of the button is located at an outwardly facing side at a bottom portion of the handle 38. The button 56 is normally maintained in an outward position by biasing action of the spring 52 against the valve 50, which presses outward against the inner side of the actuator 46. The button 56 is adapted to be depressed inward by a user as indicated by arrow 58 in FIG. 6. The blockers 88 prevent the button 56 from being pressed inward while the cover 48 is in its up closed position. Thus, the button 56 can only be depressed when the cover 48 is moved to its down open position as shown in FIG. 6.

FIG. 6 shows the second liquid dispensing system 44 after the cover has been flipped down. The valve 50 is still closed, so no liquid is dispensed. A user can now place a cup under the outlet 80 and press the button 56 to dispense liquid from the reservoir 32 and out the outlet 80. The user can use the cover 86 as a backstop to place the cup against; thereby at least partially centering the cup under the outlet 80. Referring also to FIG. 9, when the user depresses the button 56, the button depresses the movable member 58 of the valve 50 inward. This causes the seal 60 to move away from the mounting portion 62. Liquid inside the reservoir 32 can now flow through the conduit formed by the members 58 and 54 and out the outlet 80 into the user's cup. When the user releases the button 56, the spring will return the valve back to its closed position. The cover 48 can be closed to prevent residual drip.

The second member 78 also includes a top protector or shield 94 above a hole 96 through the second member at the bottom of the handle 38. The button 56 is movably mounted in the hole 96 and extends out of the hole. The protector 94 covers the top of the outwardly extending button 56 at the outer side of the handle 38. The protector 94 helps to prevent a user's hand from inadvertently pressing the button 56 inward while grasping the handle 38 during removal and return of the carafe from the coffee maker, or during tilt pouring. However, the protector 94 need not be provided, or any suitable protector or safety system to prevent inadvertent actuation of the second liquid dispensing system 44 could be provided.

One of the features of the present invention is the ability to dispense liquid from the carafe in two different fashions. First, the carafe can be removed from the coffee maker and tilted to pour liquid from the spout 42. Second, the carafe can remain in a carafe support area, e.g., in the coffee maker, and coffee dispensed by pressing the button 56 without tilting the carafe and without removing it from the support area. As seen in FIG. 1, the handle 38 extends outward past the front of the frame 18 of the coffee maker 10, allowing a user to position a cup or mug under the handle 38 for receiving coffee from the handle outlet while the carafe is still mounted to the coffee maker.

Figure 10:
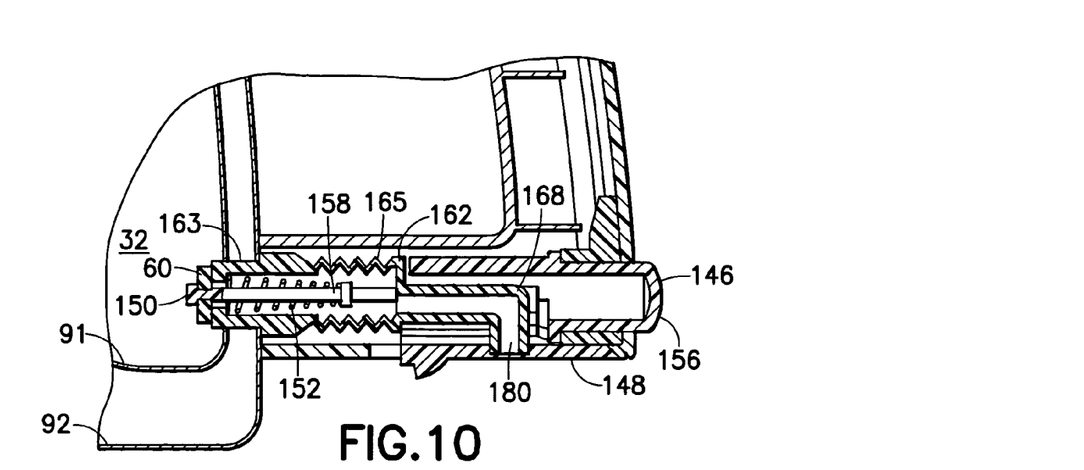
FIG. 10 is a cross sectional view of an alternate embodiment of the present invention with the bottom cover at a closed position.
Figure 11:
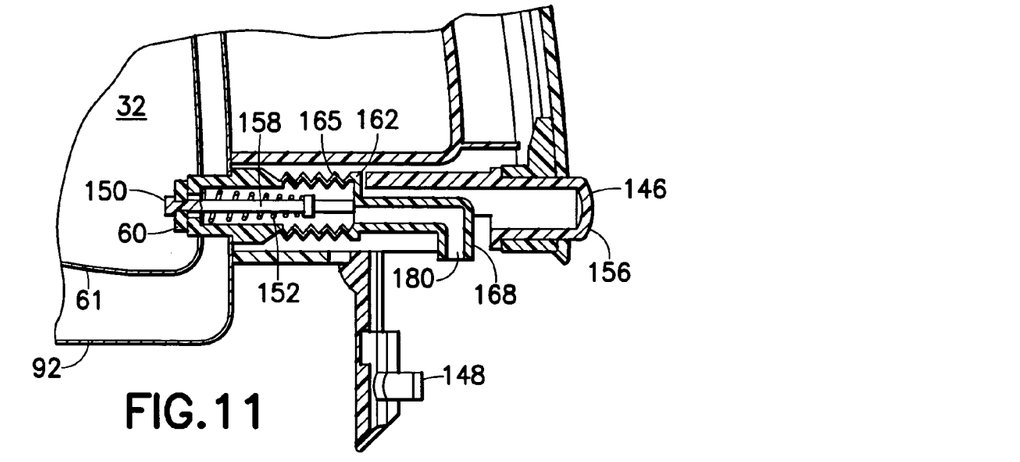
FIG. 11 is a cross sectional view as in FIG. 10 with the cover moved down to an open position.
Figure 12:
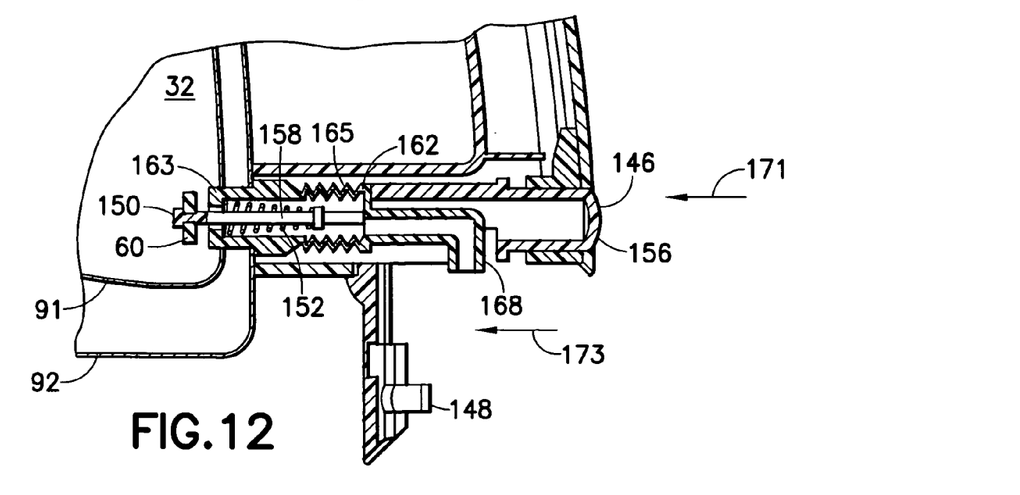
FIG. 12 is a cross sectional view as in FIG. 11 with the button and cover moved inward and the valve moved to an open position.

Referring now to FIGS. 10-12, an alternate embodiment of the present invention will be described. In this embodiment the valve 150 comprises a movable member 158, a seal 60, and a mounting and conduit member 162. In this embodiment, the mounting and conduit member 162 is not integrally formed with the lower housing portion of the main section. The two walls 91, 92 of the lower housing portion of the main section can be separate members and can be made of different materials. The mounting and conduit member 162 has a front section 163 with a general tube shape which extends from the inner reservoir 32 and laterally past the outer wall 92. A seal (not shown) can be provided between the mounting and conduit member 162 and the inner wall 91, or the front section 163 might form the seal itself.

The seal 60 is attached to the front end of the movable member 158. The seal 60 is adapted to engage the front end of the mounting and conduit member 162 when the valve 150 is in a closed position, as seen in FIGS. 10 and 11, to prevent flow of liquid through the front opening of the mounting section 162. Spring 152 biases the movable member 158 at its closed position.

The mounting and conduit member 162 also comprises a middle section 165 and a rear conduit section 168. The middle section 165 has a general accordion shape to allow the middle section to collapse and expand while still providing a conduit path. This allows the conduit section 168 to move relative to the front section 163. The conduit section 168 forms a conduit path from the middle section to the bottom of the handle 38. The handle comprises a bottom cover 148 and an actuator 146. The bottom cover 148 and actuator 146 are substantially identical to the bottom cover 48 and actuator 46 described above with respect to the embodiment in FIGS. 2-9, with one exception. In this embodiment, the cover 148 is pivotably attached to the actuator 146. When the button 156 is slid in and out, the cover can also slide in and out relative to the main body.

When the cover is in its up closed position, as shown in FIG. 10, the cover 148 can cover the outlet 180 from the conduit section 168. FIG. 11 shows the cover 148 flipped down to its down open position. The user can now dispense liquid from the reservoir out of the outlet 180 in one of two possible ways (besides the use of the first liquid dispensing system using the pour spout). As indicated in FIG. 12, the user can press the button 156 inward as indicated by arrow 171 or the user can press the cover 148 inward as indicated by arrow 173.

When the user presses the button 156 inward, as indicated by arrow 171 shown in FIG. 12, the conduit section 168 is pressed inward by the button. This causes the conduit section 168 to move the movable member 158 inward to unseat the seal 60. The cover 148 moves inward also. When the user releases the button 156, the spring 152 biases the movable member, conduit section 168 and button 156 back to their home positions shown in FIG. 11.

Alternatively, or additionally, the user can place a cup under the outlet 180 and against the cover 148. The user can press the cup against the cover 148 to cause the cover 148 to move inward. Because the cover is attached to the button 156, the button 156 also moves inward. The conduit section 168 is pressed inward by the button. This causes the conduit section 168 to move the movable member 158 inward to unseat the seal 60. When the user releases force against the cover 148 by the cup, the spring 152 biases the movable member, conduit section 168, button 156 and cover 148 back to their home positions shown in FIG. 11.

In an alternate embodiment, the cover could be adapted to function as a lever to cam the movable member inward when the cover is pivoted inward from a first downward extending position to a second downward extending position. In another alternate embodiment, the bottom handle liquid dispensing system could be used in a pot having a single wall design rather than a dual wall design. In another alternate embodiment, the button could be located at the top of the handle, or the actuator could comprise a finger trigger on the inward facing surface of the handle.

Figure 13:
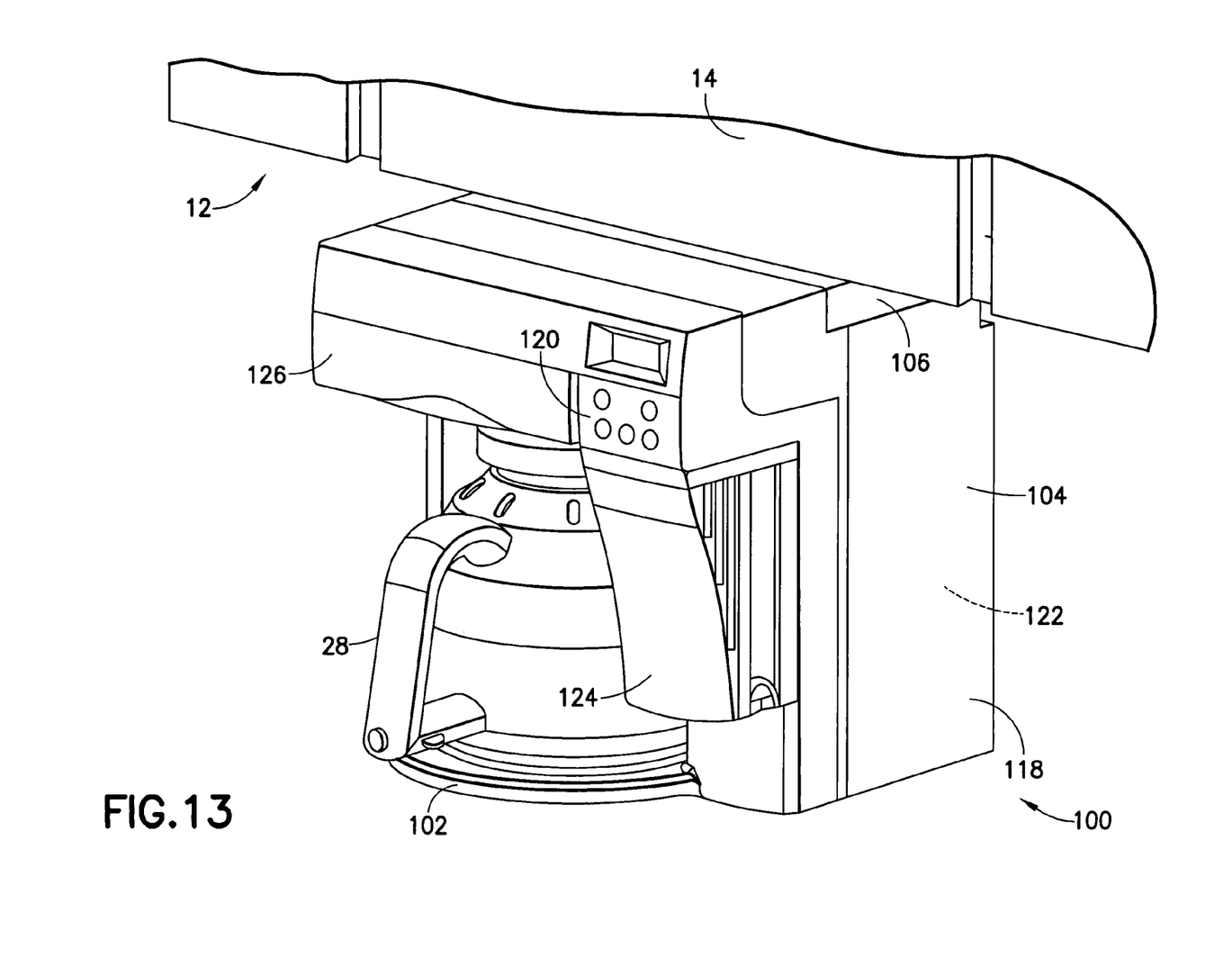
FIG. 13 is a perspective view of an exemplary embodiment of a coffee maker having a carafe incorporating features of the present invention mounted to an underside of a cabinet.
Figure 14:
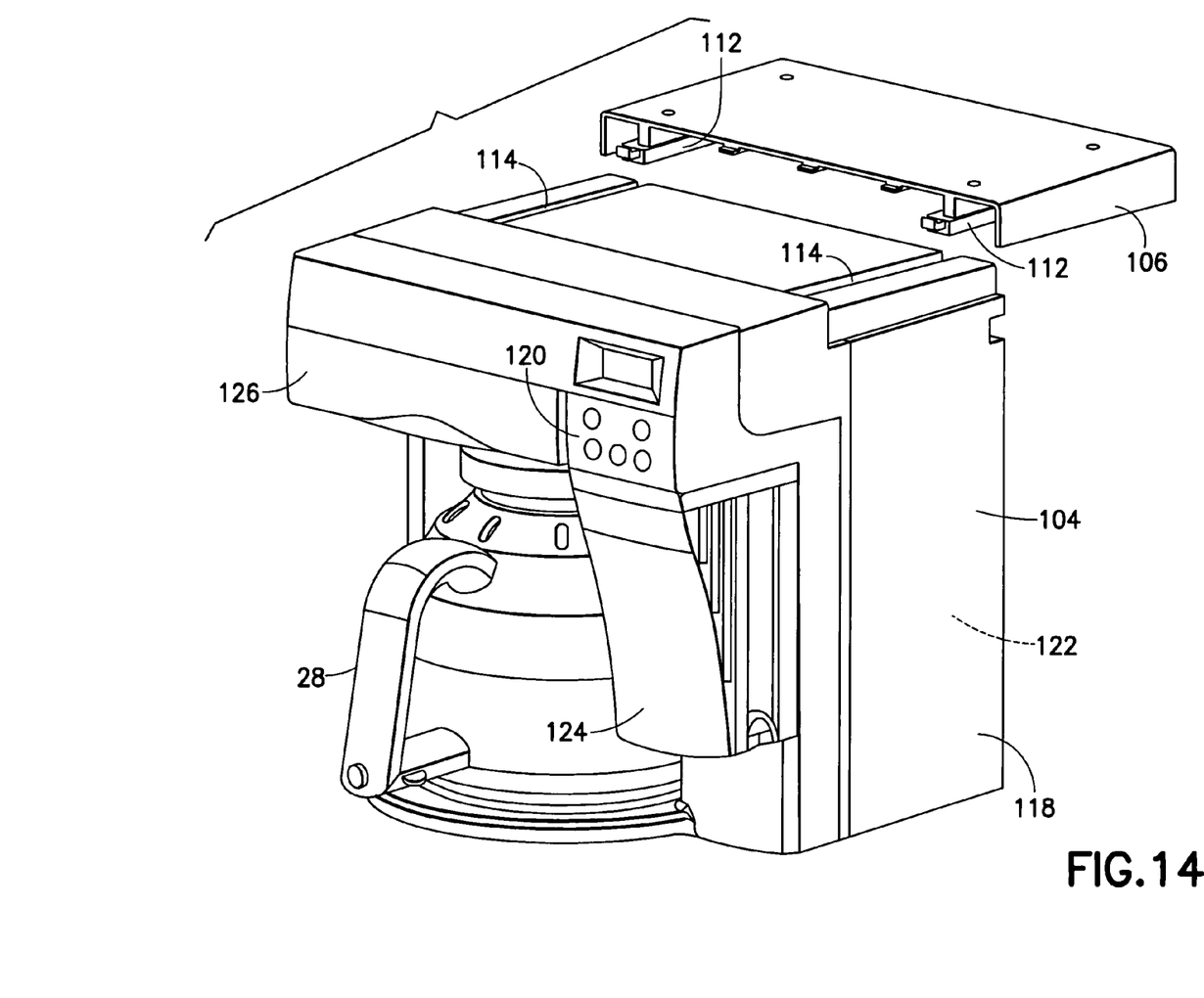
FIG. 14 is an exploded perspective view of housing sections of the coffee maker shown in FIG. 13.
Figure 15:
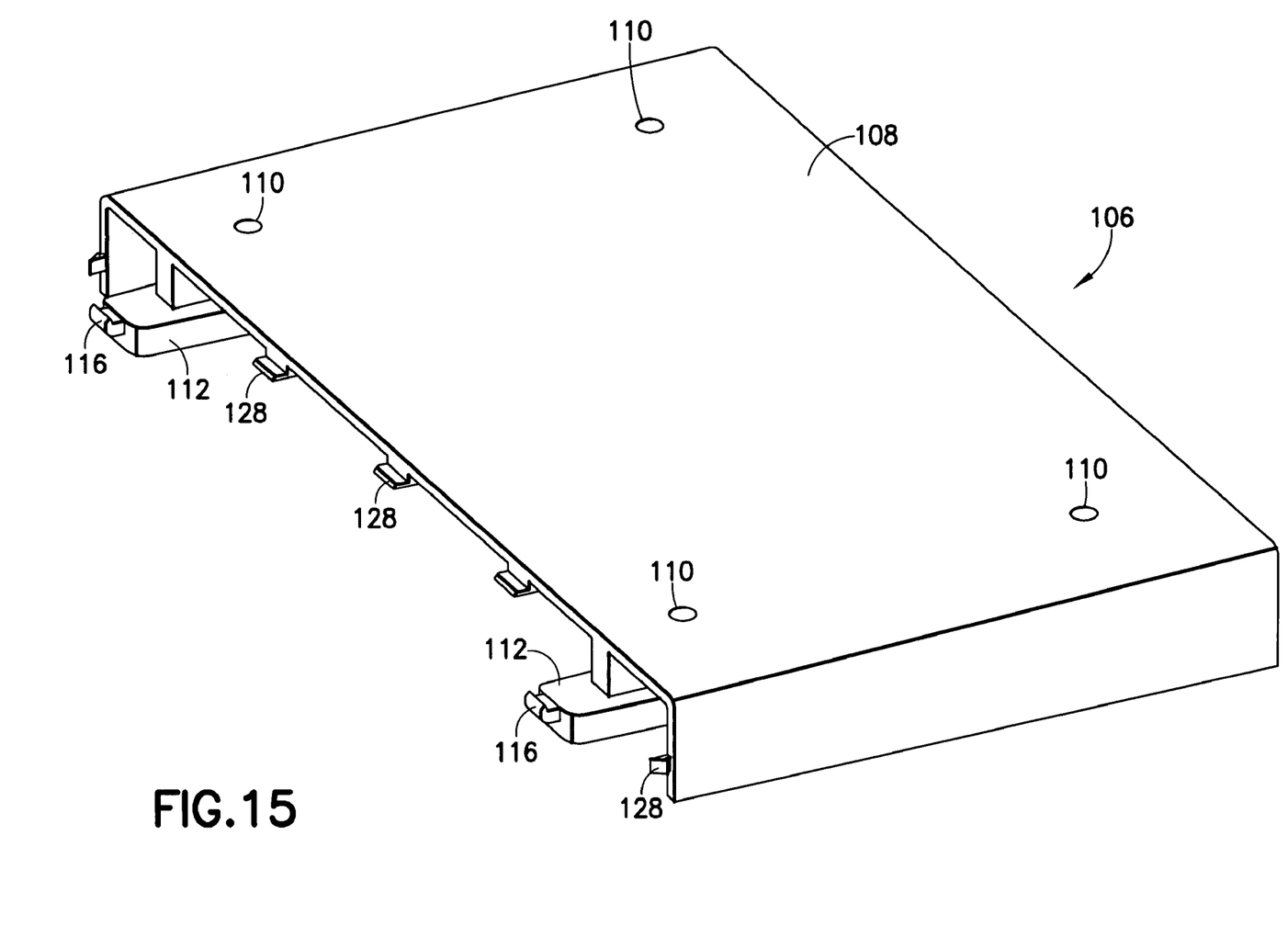
FIG. 15 is a perspective view of the frame mounting section shown in FIG. 14.

Referring now to FIGS. 13-15, an alternate embodiment of a coffee maker 100 which uses the carafe 28 is shown. The coffee maker 100 is shown attached to the underside 12 of a kitchen cabinet 14. The coffee maker 100 generally comprises a frame 118, a control section 120, a water heater 122, a removable water reservoir 124, a removable coffee grounds container 126, and the removable beverage carafe 28. The frame 118 forms a support platform 102 for the carafe 28. As seen best in FIG. 14, the frame 118 has a main section 104 and an under-cabinet mounting section 106. The main section 104 can be supported on a kitchen countertop surface without use of the under-cabinet mounting section 106 if desired.

As seen best in FIG. 15, the under-cabinet mounting section 106 generally comprises a top section 108 with mounting holes 110, and two bottom mounting rails 112. The mounting holes 110 are provided to allow fasteners (not shown), such as screws, to attach the mounting section 106 to the underside 12 of the cabinets 14. The mounting section 106 is provided separate from the main section 104 because it is lighter and, thus, easier to install onto the underside 12; with the main section 104 being subsequently attached to the mounting section 106 and, thus, the cabinet 14.

As seen in FIG. 14, the main section 104 of the housing has a top surface with two rail receiving slots 114. The slots 114 are sized and shaped to receive the rails 112 from a back end of the main section 104 and interlock the two sections 104, 106 with each other. The interlocking connection prevents the two sections 104, 106 from vertically moving relative to each other. The fronts of the rails 112 have snap locks 116 to snap lock the front of the mounting section 106 with the main section 104. The front of the mounting section 106 also comprises ledges 128. The ledges 128 are adapted to project into receiving areas in the main section 104. The ledges 128 provide a neat finish to the junction of the two sections 104, 106 with each other. The embodiment shown in FIGS. 13-15 is merely one example of an under-cabinet mounting system. In alternate embodiments, any suitable type of under-cabinet mounting system could be used.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A beverage carafe comprising:
a main section having a first liquid dispensing system comprising a pouring spout, wherein the beverage carafe can be tilted to pour liquid from the pouring spout;
a handle connected to the main section for tilting the main section; and
a second liquid dispensing system extending through the handle from the main section, wherein the second liquid dispensing system is adapted to be actuated to dispense liquid from the main section out of the handle,
wherein the second liquid dispensing system comprises a movable cover on a bottom portion of the handle,
wherein the cover is adapted to open and close an outlet of a conduit from the main section, and
wherein the cover is pivotably connected to a bottom side of the handle and is adapted to pivot between an up closed position and a down open position.

2. A beverage carafe as in claim 1 wherein the beverage carafe comprises a molded plastic outer housing member which forms portions of the main section and the handle.

3. A beverage carafe as in claim 1 wherein the main section comprises a liquid reservoir and a screw-on lid which comprises an aperture for liquid to enter the liquid reservoir from a top side of the main section, and wherein the lid is adapted to be tightened and loosened to close and open a path between the liquid reservoir and the pouring spout.

4. A beverage carafe as in claim 1 wherein the second liquid dispensing system comprises a button on the handle adapted to be depressed by a user to dispense liquid from a bottom portion of the handle.

5. A beverage carafe to as in claim 1 wherein the main section comprises an interior liquid reservoir, and wherein the second liquid dispensing system comprises a conduit extending from a bottom portion of the liquid reservoir through a bottom portion of the handle.

6. A beverage carafe as in claim 5 wherein the second liquid dispensing system comprises a user actuated control connected to a valve, wherein the valve is adapted to open and close a path through the conduit.

7. A beverage carafe as in claim 6 wherein the valve extends into the interior liquid reservoir.

8. A beverage carafe as in claim 6 wherein the valve comprises a spring loaded member forming a portion of the conduit.

9. A beverage carafe as in claim 1 wherein the cover, when in a down open position, forms a cup positioning backstop for locating a cup under the outlet from the second liquid dispensing system.

10. A beverage carafe comprising:
a main section having a first liquid dispensing system comprising a pouring spout, wherein the beverage carafe can be tilted to pour fluid from the pouring spout;
a handle connected to the main section for tilting the main section; and
a second liquid dispensing system extending through the handle from the main section, wherein the second liquid dispensing system is adapted to be actuated to dispense liquid from the main section out of the handle, the second liquid dispensing system comprising:
a movable cover on a bottom portion of the handle, wherein the cover is adapted to open and close an outlet of a conduit from the main section; and
a control for selectively dispensing liquid through the handle, wherein the control comprises the movable cover forming a lever for opening a valve of the second liquid dispensing system.

11. A coffee maker comprising:
a main unit comprising a coffee brewing section, wherein the main unit is adapted to be mounted to an underside of a cabinet; and
a carafe removably connected to the main unit to receive coffee from the coffee brewing section, wherein the carafe comprises: a first outlet for pouring the coffee when the carafe is removed from the main unit; a second outlet for dispensing the coffee from the carafe when the carafe is mounted to the main unit; and a moveable cover on a bottom portion of a handle, wherein the cover is adapted to open and close the second outlet, and wherein the cover is pivotably connected to a bottom side of the handle and is adapted to pivot between an up closed position and a down open position.

12. A coffee maker as in claim 11 wherein the carafe comprises a molded plastic outer housing member which forms portions of a main section and a handle, and wherein the second outlet is at the handle.

13. A coffee maker as in claim 12 wherein the main section comprises a liquid reservoir and a screw-on lid which comprises an aperture for liquid to enter the liquid reservoir from a top side of the main section, and wherein the lid is adapted to be tightened and loosened to close and open a path between the liquid reservoir and the first outlet.

14. A coffee maker as in claim 11 wherein the carafe comprises a second liquid dispensing system comprising the second outlet and a button on a handle adapted to be depressed by a user to dispense liquid from a bottom of the handle.

15. A coffee maker to as in claim 11 wherein, the carafe comprises an interior liquid reservoir, and a second liquid dispensing system comprising the second outlet and a conduit extending from a bottom portion of a liquid reservoir through a bottom portion of a handle of the carafe.

16. A coffee maker as in claim 15 wherein the second liquid dispensing system comprises a user actuated control connected to a valve, wherein the valve is adapted to open and close a path through the conduit.

17. A coffee maker as in claim 16 wherein the valve extends into the interior liquid reservoir.

18. A coffee maker as in claim 16 wherein the valve comprises a spring loaded member forming a portion of the conduit.

19. A coffee maker as in claim 11 wherein the cover, when in a down open position, forms a cup positioning backstop for locating a cup under the second outlet.

20. A coffee maker as in claim 11 wherein the main unit comprises a frame with a main section and an under-cabinet mounting section connected to the main section.

21. A coffee maker as in claim 20 wherein the under-cabinet mounting section comprises a bottom side with horizontal rails, and wherein the main section of the frame is mounted in the rails.

22. A coffee maker comprising:

a main unit comprising a coffee brewing section, wherein the main unit is adapted to be mounted to an underside of a cabinet; and a carafe removably connected to the main unit to receive coffee from the coffee brewing section, wherein the carafe comprises: a first outlet for pouring the coffee when the carafe is removed from the main unit; a second outlet for dispensing the coffee from the carafe when the carafe is mounted to the main unit; and a moveable cover on a bottom portion of a handle, wherein the cover is adapted to open and close the second outlet, wherein the carafe comprises a control for selectively dispensing liquid through the handle, wherein the control comprises the movable cover forming a lever for opening a valve to the second outlet.

* * * * *